US005186299A

United States Patent [19]

Stimson

[11] Patent Number: 5,186,299

[45] Date of Patent: Feb. 16, 1993

[54] CONCRETE CHUTE APPARATUS

[76] Inventor: Brian L. Stimson, 286 Kansas-Jake Rd., Waco, Ga. 30182

[21] Appl. No.: 852,403

[22] Filed: Mar. 16, 1992

[51] Int. Cl.[5] .............................................. B65G 11/00

[52] U.S. Cl. ....................................... 193/2 R; 193/4; 193/21; 193/25 A

[58] Field of Search .................... 193/2 R, 3, 4, 5, 10, 193/20, 21, 25 A, 25 R, 32; 222/557, 558

[56] References Cited

U.S. PATENT DOCUMENTS 1,720,677 7/1929 Howlett ................................ 193/21
1,733,118 10/1929 Eddy ...................................... 193/20
2,668,648 2/1954 Carlsen ................................. 193/21
3,746,140 7/1973 Schiffelbein ........................... 193/5
3,930,567 1/1976 Sims ....................................... 193/4
4,054,194 10/1977 Davis ................................. 193/2 R
4,190,144 2/1980 Lybbert ............................... 193/10
4,688,667 8/1987 Peterson .............................. 193/10
5,035,313 7/1991 Smith ................................. 193/5 X
5,056,641 10/1991 Loefke et al. ....................... 193/2 R

*Primary Examiner*—Joseph F. Valenza
*Assistant Examiner*—Cheryl L. Gastineau
*Attorney, Agent, or Firm*—Leon Gilden

[57] ABSTRACT

A discharge chute is arranged for pivotally mounting an abutment plate at a distal end of the chute to prevent further spillage and flow of concrete through the chute. The abutment plate may be hingedly mounted about a first end thereof or pivotally mounted about a plurality of spaced rods that are mounted to top edges of the chute.

4 Claims, 2 Drawing Sheets

CONCRETE CHUTE APPARATUS

BACKGROUND OF THE INVENTION

1. Field of the Invention

The field of invention relates to concrete apparatus, and more particularly pertains to a new and improved concrete chute apparatus wherein the same is arranged to permit arresting of concrete flow through the chute.

2. Description of the Prior Art

Concrete flow from associated cement trucks is conventionally utilized to provide concrete to various construction sites. Various concrete chute apparatus in directing of flow from a concrete chute is exemplified in the prior art and typically set forth in U.S. Pat. No. 3,746,140 to Schiffelbein illustrating a concrete chute utilizing a door plate mounted in a spaced relationship relative to the concrete chute.

U.S. Pat. No. 4,190,144 to Lybbert sets forth a further example of a concrete chute structure utilizing various sections arranged for securement together.

U.S. Pat. No. 4,054,194 to Davis sets forth a concrete chute formed with a replaceable polyurethane liner.

U.S. Pat. No. 4,688,667 to Peterson sets forth an attachment for a concrete chute utilizing a door assembly mounted to the chute permitting closure thereof.

As such, it may be appreciated that there continues to be a need for a new and improved concrete chute apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of concrete chute apparatus now present in the prior art, the present invention provides a concrete chute apparatus wherein the same utilizes an abutment plate hingedly mounted relative to a distal end of the concrete chute. As such, the general purpose of the present invention, which will be described subsequently in greater detail, is to provide a new and improved concrete chute apparatus which has all the advantages of the prior art concrete chute apparatus and more of the disadvantages.

To attain this, the present invention provides a discharge chute arranged for pivotally mounting an abutment plate at a distal end of the chute to prevent further spillage and flow of concrete through the chute. The abutment plate may be hingedly mounted about a first end thereof or pivotally mounted about a plurality of spaced rods that are mounted to top edges of the chute.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved concrete chute apparatus which has all the advantages of the prior art concrete chute apparatus and none of the disadvantages.

It is another object of the present invention to provide a new and improved concrete chute apparatus which may be easily and efficiently manufactured and marketed.

It is a further object of the present invention to provide a new and improved concrete chute apparatus which is of a durable and reliable construction.

An even further object of the present invention is to provide a new and improved concrete chute apparatus which is susceptible of a low cost of manufacture with regard to both materials and labor, and which accordingly is then susceptible of low prices of sale to the consuming public, thereby making such concrete chute apparatus economically available to the buying public.

Still yet another object of the present invention is to provide a new and improved concrete chute apparatus which provides in the apparatus and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
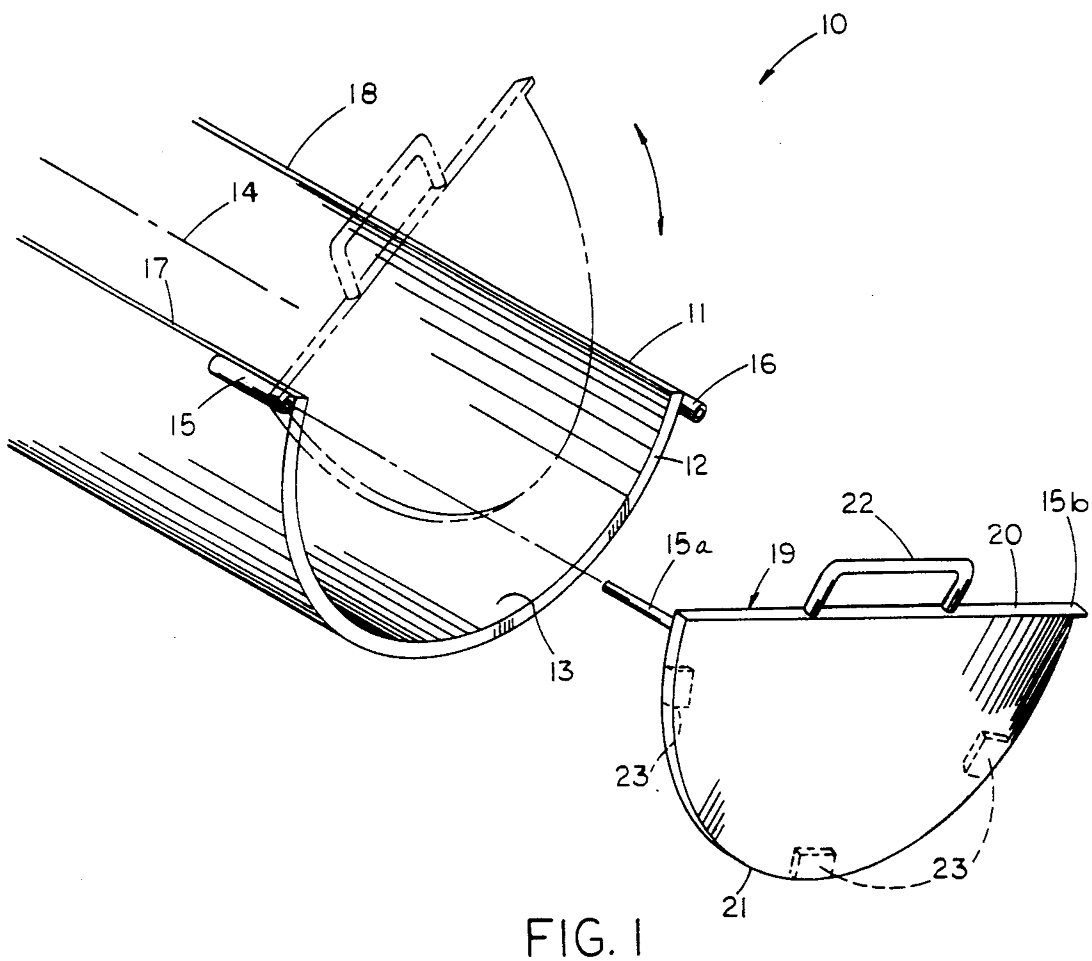
FIG. 1 is an isometric illustration of the instant invention.
Figure 2:
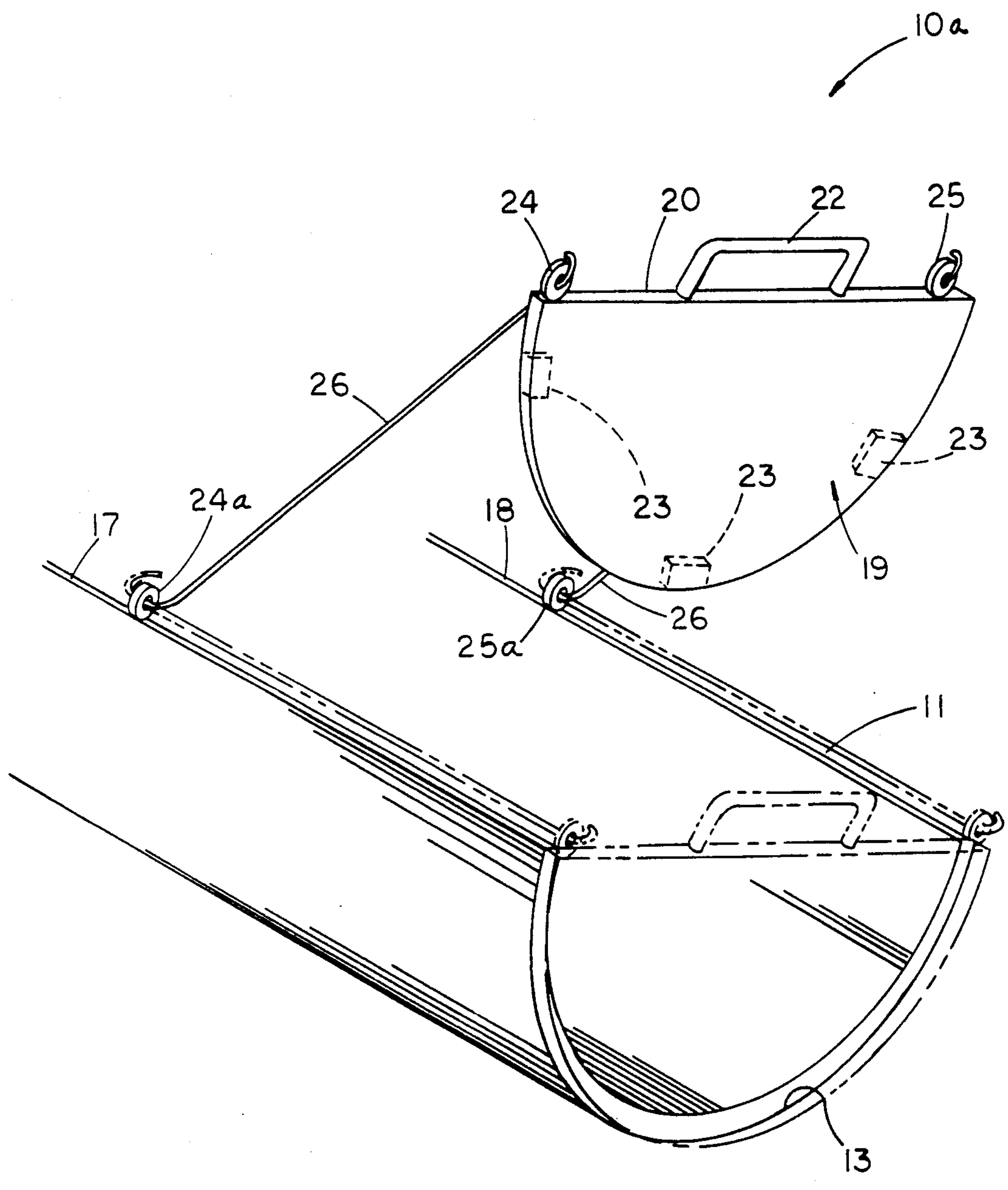
FIG. 2 is an isometric illustration of a modification of the invention.

With reference now to the drawings, and in particular to FIGS. 1 and 2 thereof, a new and improved concrete chute apparatus embodying the principles and concepts of the present invention and generally designated by the reference numerals 10, and 10*a* will be described.

More specifically, the concrete chute apparatus 10 of the instant invention essentially comprises a concrete discharge chute 11 arranged in cooperation with a conventional cement truck (not shown) of a type as exemplified in U.S. Pat. No. 4,190,144 incorporated herein by reference. The chute 11 includes a distal end surface 12 substantially orthogonally oriented relative to a chute axis 14, wherein the chute includes a concave interior surface 13 to receive fluid flow of concrete therethrough. A hinged tube 15 is mounted to a chute first top edge 17 spaced from and parallel a chute second edge 18. The hinged tube 15 is mounted adjacent the distal end surface 12 to receive a pivot rod 15*a* that is orthogonally and integrally mounted to a planar rear face of an abutment plate 19. An abutment flange 15*b* is coplanar with an abutment plate top wall 20 that is orthogonally oriented relative to the rear face of the abutment plate 19 for contact with an abutment lug 16 extending longitudinally parallel relative to the chute second edge 18. The abutment plate includes an arcuate bottom wall 21 orthogonally oriented between the front and rear parallel walls of the abutment plate which may be provided to include magnet members 23 to enhance engagement with the abutment plate relative to the distal end surface 12. A handle 22 fixedly mounted to the top wall 20 permits ease of manual manipulation of the abutment plate in use.

The FIG. 2 illustrates a modified apparatus 10*a* to include a first and second support mount 24 and 25 mounted to the top wall 20 at opposed ends thereof extending upwardly thereof, with each including a mounting rod 26 fixed thereto. Each lower distal end of each mounting rod 26 is mounted within a respective third and fourth support ring mount 24*a* and 25*a* relative to the first and second support mounts 24 and 25. The third and fourth support rings are mounted to the respective chute first and second edges 17 and 18 permitting relative reciprocation of the abutment plate 19 relative to the chute structure 11.

It should be noted that the abutment plate arcuate bottom wall 21 arranged for complementary reception within the concave interior surface 13 may be further provided with the magnet structure 23, as illustrated in FIG. 1, to enhance engagement with the interior surface 13. If required, ferrous plates may be secured within the surface 13 at its lower distal end.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A concrete chute apparatus, comprising in combination, a concrete discharge chute, the chute including a distal end surface, and the chute oriented about a chute axis, wherein the chute is of a generally semi-cylindrical configuration and includes a chute first edge spaced from and parallel a chute second edge, with the distal end surface orthogonally oriented relative to the chute axis, and the chute including a concave interior surface, and an abutment plate, the abutment plate including hinge means mounted to the chute first edge for pivotment of the abutment plate relative to and in an orthogonal orientation to the chute axis.

2. An apparatus as set forth in claim 1 wherein the abutment plate includes a rear wall spaced from and parallel a front wall, the rear wall and the front wall are orthogonally oriented relative to the chute axis, and the abutment plate includes a top wall, the top wall including a handle arranged for manual manipulation of the abutment plate.

3. An apparatus as set forth in claim 2 wherein the hinge means includes a hinge rod fixedly mounted to the first edge, and the abutment plate top wall including a first end, wherein the first end includes a hinge tube slidably receiving the hinge rod therethrough, and the abutment plate top wall includes an abutment flange arranged for abutment with the chute second edge, and the abutment plate including an arcuate bottom wall complementarily received by the concave interior surface.

4. An apparatus as set forth in claim 3 wherein the arcuate bottom surface includes a plurality of equally spaced magnets projecting within the abutment plate cooperative with the concave interior surface to secure the abutment plate relative to the concave interior surface, wherein the chute is formed of a ferrous material.

* * * * *